United States Patent [19]

McCombie

[11] 4,099,608
[45] Jul. 11, 1978

[54] APPARATUS FOR FEEDING ARTICLES

[75] Inventor: Alan Keith McCombie, London, England

[73] Assignee: Molins Machine Company Limited, London, England

[21] Appl. No.: 597,431

[22] Filed: Jul. 21, 1975

Related U.S. Application Data

[60] Division of Ser. No. 234,833, Mar. 15, 1972, abandoned, which is a continuation of Ser. No. 875,402, Nov. 10, 1969, abandoned.

[30] Foreign Application Priority Data

| Nov. 14, 1968 | [GB] | United Kingdom | 54034/68 |
| Feb. 14, 1969 | [GB] | United Kingdom | 8313/69 |
| Feb. 28, 1969 | [GB] | United Kingdom | 10941/69 |
| Jan. 24, 1969 | [GB] | United Kingdom | 4195/69 |
| Jan. 24, 1969 | [GB] | United Kingdom | 4196/69 |

[51] Int. Cl.² .............................................. B65G 43/08
[52] U.S. Cl. ................................... 198/347; 198/572; 198/855
[58] Field of Search ................. 198/20 C, 37, 53, 84, 198/136, 165, 347, 572, 855, 573

[56] References Cited

U.S. PATENT DOCUMENTS

| 3,280,961 | 10/1966 | McCombie | 198/165 |
| 3,297,138 | 1/1967 | McCombie | 198/84 |
| 3,355,004 | 11/1967 | Rupert | 198/37 |
| 3,433,347 | 3/1969 | Molins et al. | 198/37 |
| 3,450,250 | 6/1969 | Frisk | 198/136 |
| 3,472,358 | 10/1969 | Poupin | 198/37 |

FOREIGN PATENT DOCUMENTS

| 583,761 | 5/1923 | France | 198/165 |

*Primary Examiner*—Evon C. Blunk
*Assistant Examiner*—Jeffrey V. Nase
*Attorney, Agent, or Firm*—Craig & Antonelli

[57] ABSTRACT

A conveyor system for cigarettes and other rod-like articles includes a reservoir consisting of a conveyor which is preferably laterally flexible and moves along a helical path so that a long thin stack of articles can be taken into the reservoir and can be delivered from the reservoir when necessary. The conveyor may consist of a plastic surface member which has a flexible zig-zag shape and is driven by a chain. The conveyor system may be overhead and may receive the articles from an elevator consisting of two parallel bands moving upwards along a minuous path so as to grip the articles between them.

13 Claims, 25 Drawing Figures

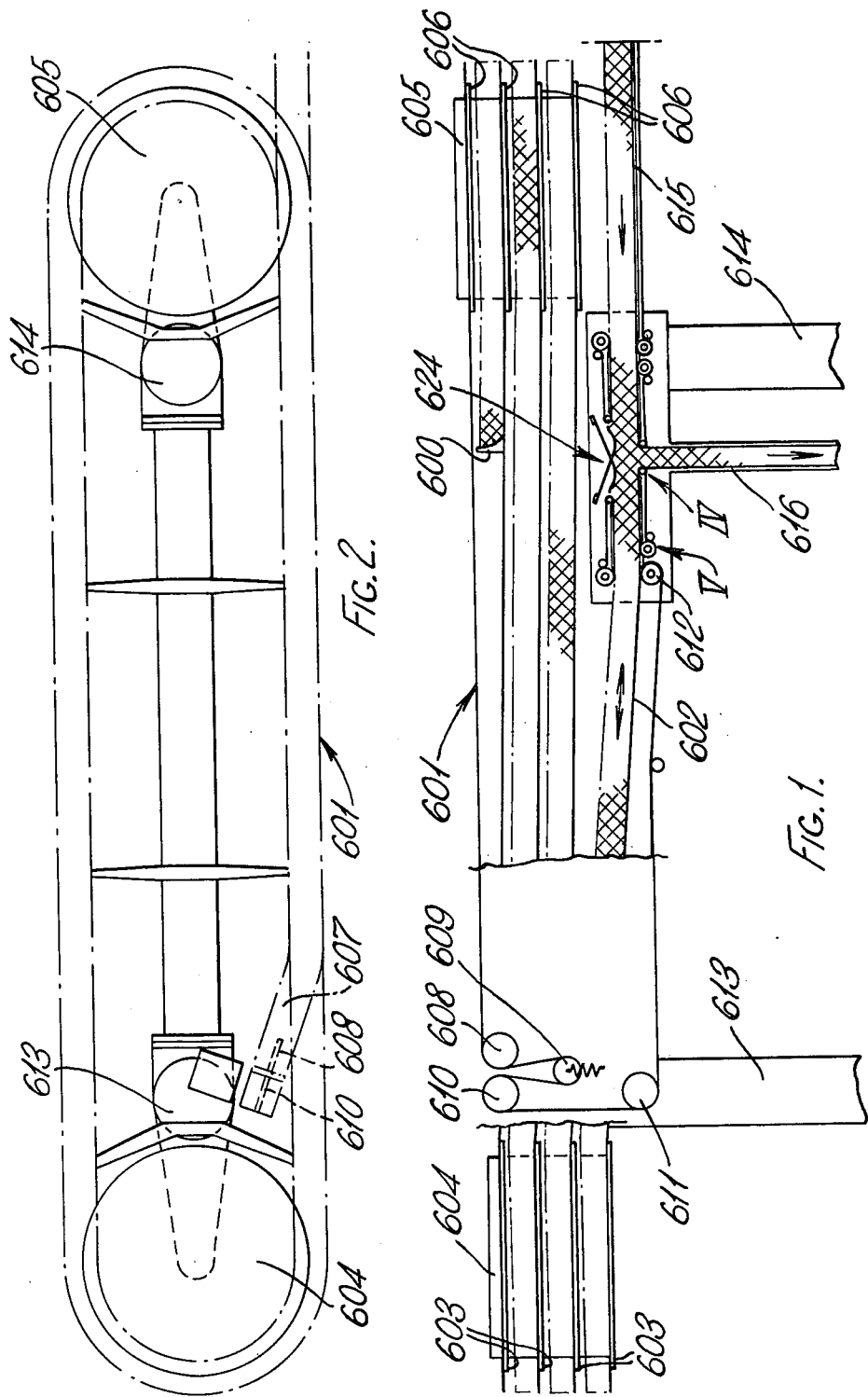

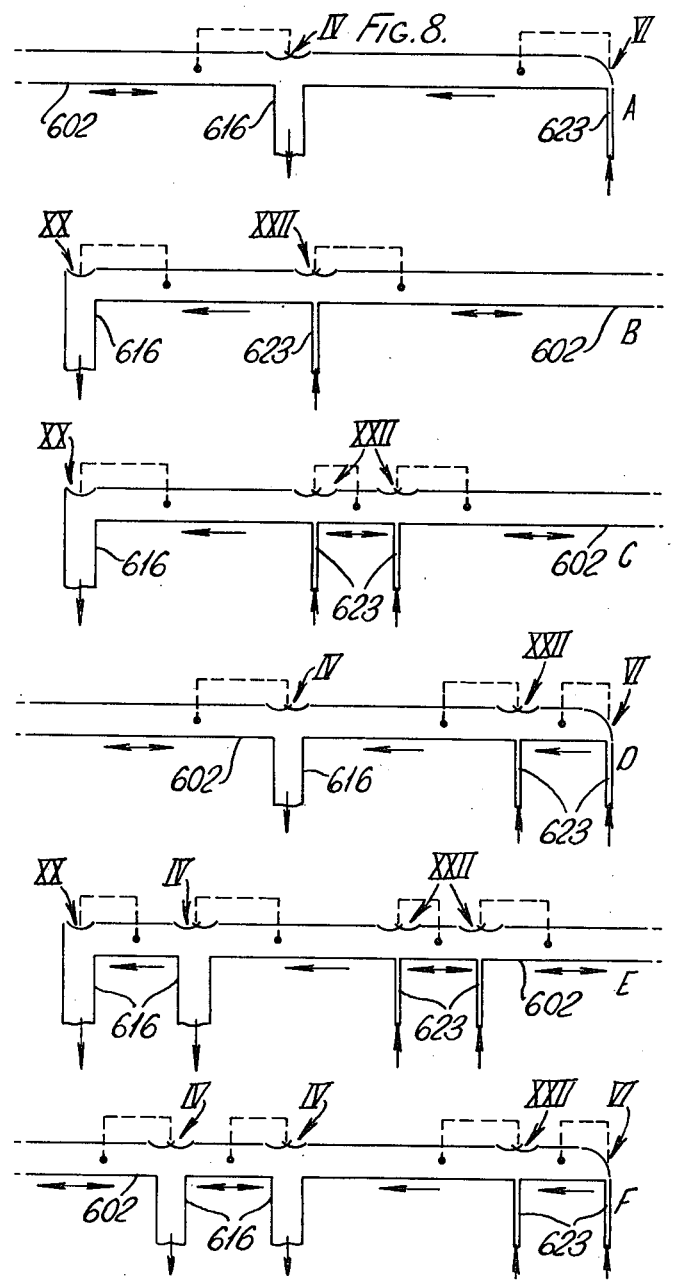

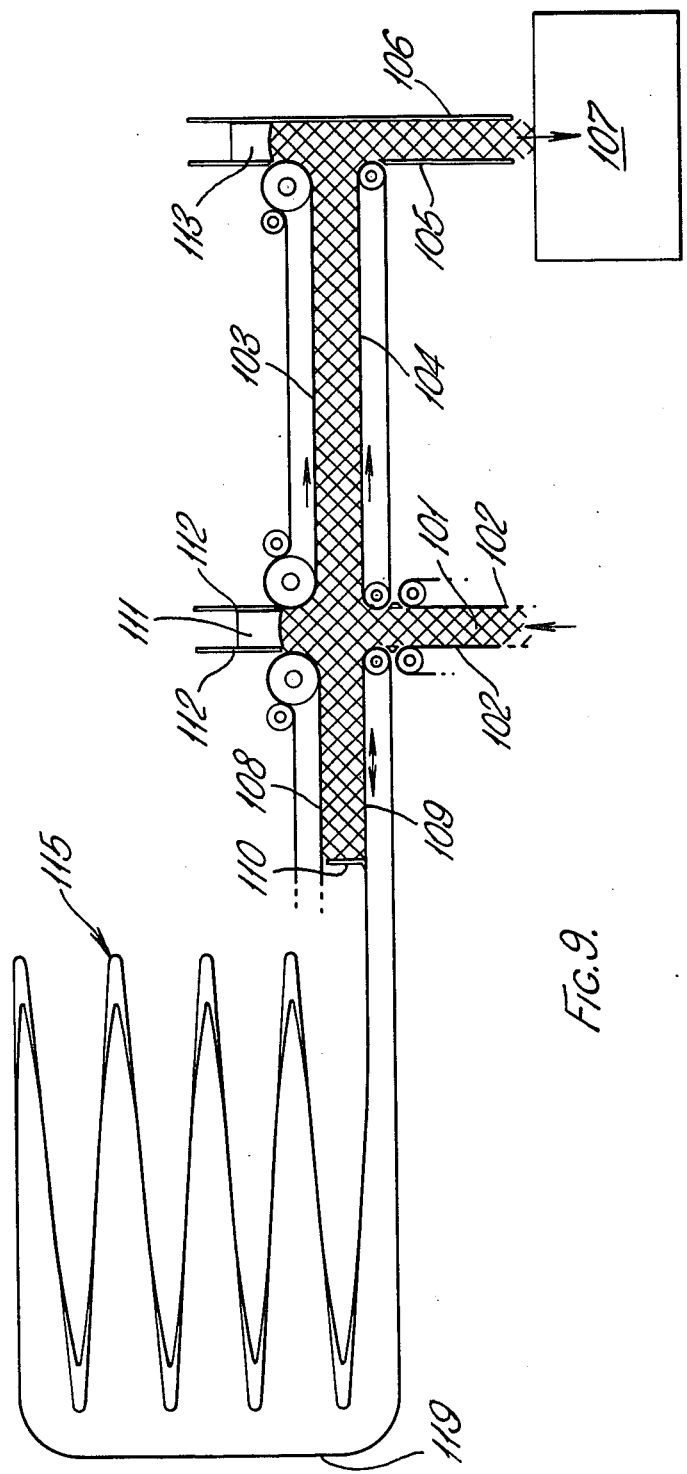

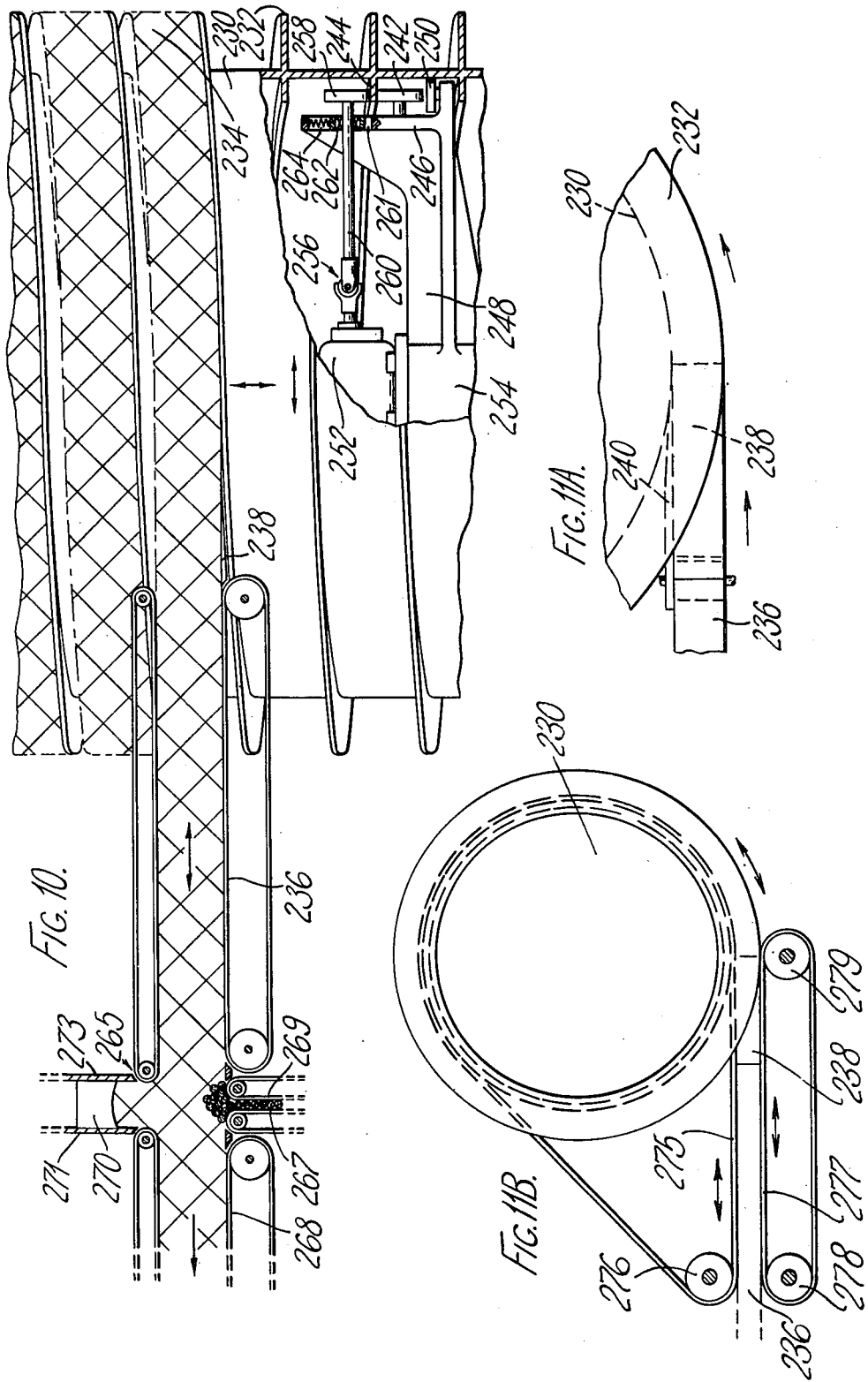

APPARATUS FOR FEEDING ARTICLES

This is a division of application Ser. No. 234,833, filed Mar. 15, 1972, which is a continuation of Ser. No. 875,402, filed Nov. 10, 1969, both abandoned.

This invention is particularly concerned with the feeding of cigarettes, but it is also applicable to the feeding of other rod-like articles, for example cigarette filter rods or cigars.

Various proposals have been made for feeding for example cigarettes from one or more cigarette-making machines to one or more cigarette-packing machines with the aid of a variable-capacity reservoir which absorbs or makes up the difference between the rates of supply and demand. One aspect of the present invention is concerned particularly with an improved reservoir. According to this aspect of the invention a conveyor system for feeding cigarettes or other rod-like articles sideways between an article-delivery device and an article-receiving device (which receives the articles in stack formation) includes a variable-capacity reservoir comprising a conveyor which serves as the floor of the reservoir and which, when the reservoir is at maximum capacity, carries a long stack of articles of which the length is considerably greater than the thickness which is approximately the same as the thickness of the stack delivered to the article-receiving device.

An advantage of this arrangement is that the articles (and this is especially important if they are cigarettes) are subjected to less relative jostling or rolling than occurs when a thick stack in the reservoir has to be transformed into a much thinner stack as required by the article-receiving device (for example a cigarette packing machine). Indeed in a preferred system according to this invention the articles are carried into the reservoir as a stack of uniform thickness and remain in the reservoir in the same stack formation and are carried out of the reservoir while still in the same stack formation, so that from the form the moment the articles enter the reservoir, to the moment they leave the reservoir, there is little or no relative movement between the articles.

The reservoir may extend along a path which includes lateral bends, in which case the conveyor forming the floor of the reservoir is made laterally flexible. The path preferably includes a helix. A suitable conveyor for this purpose comprises a conveyor surface member which is flexible so as to be capable of passing round a pulley and is slotted at regular intervals from both edges so as to be capable of curving laterally; such a conveyor is also useful in its own right for other purposes.

The term "helix" in this context is not intended to be limited to a cylindrical helix, that is to say with circular turns; the turns of the helix could for example be oval.

A preferred reservoir according to this invention is one in which the articles enter and leave at the same end. In other words the conveyor serving as the floor of the reservoir moves in one direction to carry articles into the reservoir and in the opposite direction to carry articles out of the reservoir. As an alternative, however, the articles could enter and leave the reservoir at opposite ends, as in the arrangement described in British Pat. No. 995,663; for this purpose the reservoir could in effect comprise a series of reservoirs (like that shown in British Pat. No. 995,663) connected one above the other so that the complete reservoir extends to and fro along several horizontal passes in zig-zag fashion and forms a channel of uniform width to receive a stack of uniform thickness, the stack being fed in at one end (for example the upper end) and being discharged at the other end, and the capacity of the reservoir would be varied by varying the length of the horizontal passes, as in British Pat. No. 995,663.

As already mentioned, the reservoir is arranged to receive a stack of which the length is considerably greater than the thickness. As an example, in the case of a cigarette factory, the length of the stack which can be received by the reservoir may be 30 to 90 meters, and would rarely be less than 12 meters. This length may be arranged to wind its way around the factory wherever there is space available, preferably without the path of the reservoir having any steep sections, for example over 10° to the horizontal, so that the cigarettes will remain in place (i.e. not roll about) without needing a top cover band.

Examples of various arrangements according to this invention are shown in the accompanying drawings. In these drawings:

FIG. 1 is a side view of part of one conveyor system including the reservoir;

FIG. 2 is a plan view of the reservoir;

FIG. 8 shows diagrammatically six different systems according to this invention;

FIG. 9 shows another different system;

FIG. 10 is a side view of another different system including particularly a different reservoir;

FIGS. 11A and 11B show, in plan view, alternative ways of feeding the cigarettes into and out of the reservoir;

Figure 3:
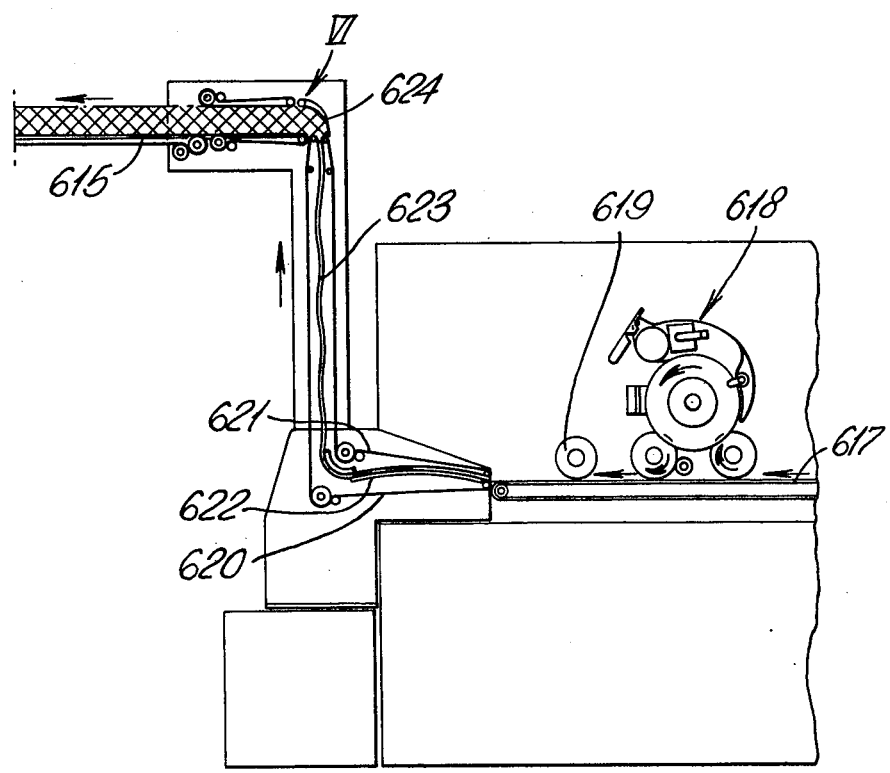
FIG. 3 is a side view of another part of the system which joins up with the part shown in FIG. 1.

The invention will be described with reference to its use in connection with cigarettes, but it should be understood that it can also be used in connection with other rod-like articles.

FIG. 1 shows part of a conveyor system which includes a helical reservoir 601 comprising a laterally flexible conveyor 602 which moves up a slightly inclined track leading to one of four flanges 603 on a rotatable drum 604 and then passes round the drum 603 (being supported by the flange 603). The conveyor, which comprises a plastic surface member connected to a chain (as shown in FIGS. 12 to 17), is then carried by a track (not shown) towards a second drum 605 which has four support flanges 605. The conveyor then passes to and fro around the drums along a helical path, being supported by the flanges while passing round the drums. At the top of the helix, the conveyor is deflected inwards at 607 and then passes over and round a sprocket 608 engaging the chain, down and below a tensioning pulley 609, and then upwards and over a sprocket 610. Finally the conveyor returns round further sprockets 611 and 612.

Figure 4:
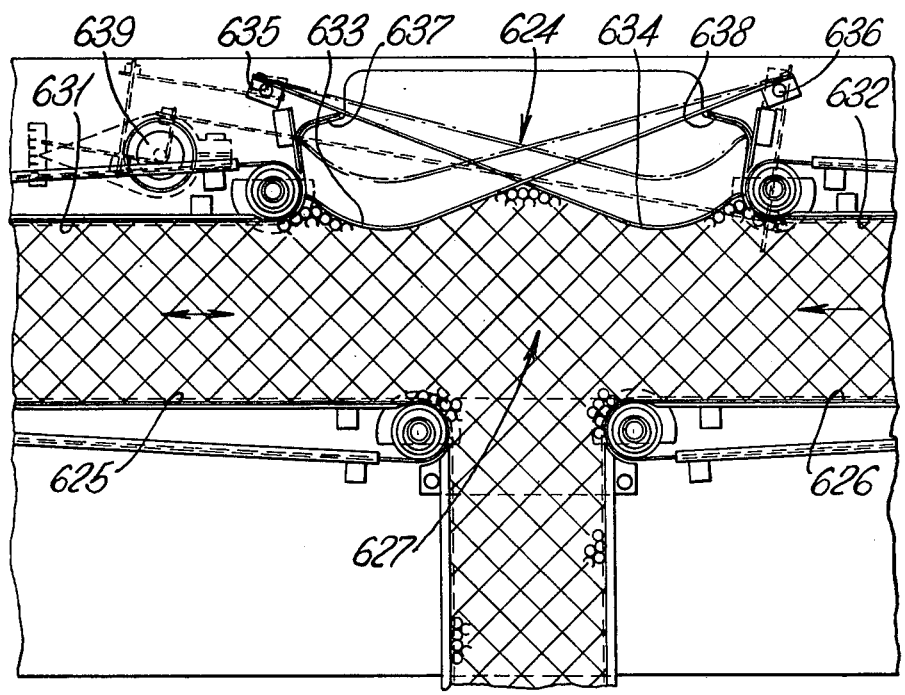
FIG. 4 is an enlarged view of a portion indicated by the arrow IV in FIG. 1.

The reservoir is mounted overhead on pillars 613 and 614 and is connected to a horizontal overhead conveyor 615 at a junction IV which is shown in detail in FIG. 4. A chute 616 extends downwards from the junction and supplies cigarettes to a cigarette packing machine (now shown).

FIG. 3 shows how the cigarettes are fed on to the conveyor 615. A conveyor 617 delivers a single row of cigarettes (moving sideways) from a cigarette-making machine (not shown). The cigarettes are picked up by a cigarette testing device 618 which then returns the cigarettes to the conveyor 617. Any faulty cigarettes are ejected by a device 619.

At the end of the conveyor 617 the cigarettes are picked up between two parallel bands 620 and 621 which are constrained to move along a continuously curving path so as to grip the cigarettes substantially all the way owing to the tension in whichever band is on the outside of the curve. The bands move the cigarettes firstly along an horizontal path 622 and then up a sinuous elevator 623 which is shown more clearly in FIG. 6. At the upper end of the elevator the cigarettes form a stack and are carried away in stack formation by the conveyor 615. The speed of the conveyor 615 varies in response to the height of a sensor 624 in a manner which will be described with reference to FIG. 6, which is an enlarged view of the part of the system indicated by the arrow VI in FIG. 3.

As an alternative to the arrangement shown in FIG. 3, a testing device 618 may deposit the cigarettes straight on to the band 620 (which would in that case be extended somewhat to the right) without the intermediary of the conveyor 617.

During operation of the conveyor system, cigarettes pass down the chute 616 at the rate demanded by the cigarette packing machine. So long as cigarettes are supplied by the cigarette making machine at the same rate, that is to say via the conveyor 615, the reservoir conveyor 602 remains stationary. However, when the rate of supply by the maker exceeds the rate of demand by the packer, or when the packer is temporarily stopped, the conveyor 602 carries cigarettes to the left from the junction IV and into the reservoir at a speed determined by a double-plate sensor 624 which will be described more fully with reference to FIG. IV. Conversely, when demand exceeds supply (and assuming of course that the reservoir does at that time contain some cigarettes), or when the maker stops temporarily, the deficiency at the junction IV is made up by the reservoir conveyor which then moves to the right at a speed determined by the double sensor 624.

Figure 5:
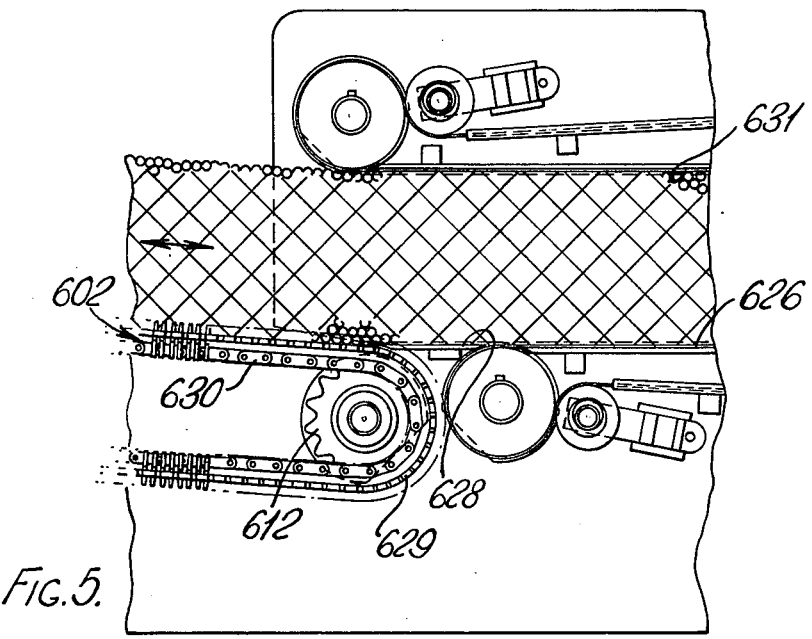
FIG. 5 is an enlarged view of a portion indicated by the arrow V in FIG. 1.

The conveyor 602 is driven by a drive sprocket (for example the sprocket 611) engaging the conveyor chain which is shown particularly in FIG. 5. The drums 604 and 605 of the reservoir are arranged to be driven at the same peripheral speed as the conveyor 602.

The end of the stack of cigarettes in the reservoir is preferably defined by an end wall 600 connected to the conveyor 602. A preferred arrangement will be described with reference to FIGS. 18 and 19.

The conveyor 615 may be a laterally flexible conveyor (for example like the conveyor 602) so that it can be arranged, if necessary, to move along a path including for example a right-angle bend.

FIG. 4 shows in detail the T-junction between the overhead conveyors 602 and 615 and the chute 616. More particularly FIG. 4 shows parts of two band conveyors 625 and 626 which extend respectively between the the conveyors 602 and 615 and a junction zone 627. FIG. 5 shows for example how the cigarette stack passes over a stationary bridge 628 in passing from the band conveyor 626 to the conveyor 602 or vice versa. FIG. 5 shows also that the conveyor 602 consists of a surface member 629 connected to a chain 630, as will be described more particularly with reference to FIGS. 12 to 17.

Each of the band conveyors 625 and 626 has an associated parallel band conveyor 631 or 632 which forms a moving roof for the stack of cigarettes and moves at the same speed as the respective band conveyor 625 or 626 (which is the same as the speed of the conveyor 602 or 615). Once the stack has been properly formed, for example as it enters the reservoir, no stationary or moving roof is needed to confine the upper surface of the stack. The vertical spacing between the flanges 603 and 606 on the drums 604 and 605 of the reservoir is sufficient to leave clearance between the cigarette stack and the flange above it.

The sensor 624 above the junction zone 627 comprises two plates 633 and 634 which are pivoted at 635 and 636 respectively so as to be able to swing up and down in response to the pressure of the cigarettes below them. They are shown in solid outline in their lowest position in which they engage the upper edges of two walls 637 and 638 which also determine the highest possible positions of the plates (shown in broken outline) and help to confine the cigarettes in the junction zone.

Figure 22:
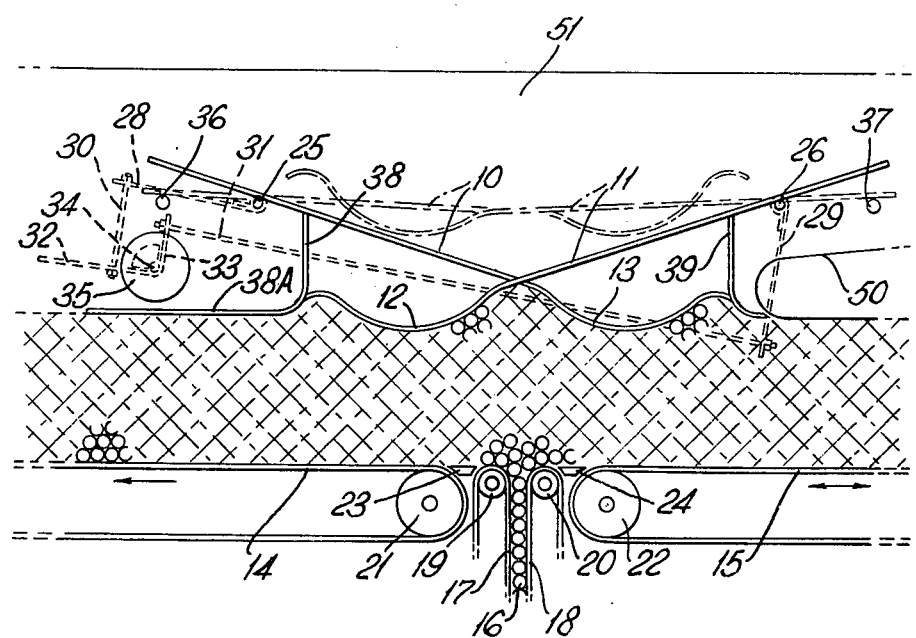
FIG. 22 is an enlarged view of one of the sensor mechanisms XXII shown in FIG. 8.
Figure 23:
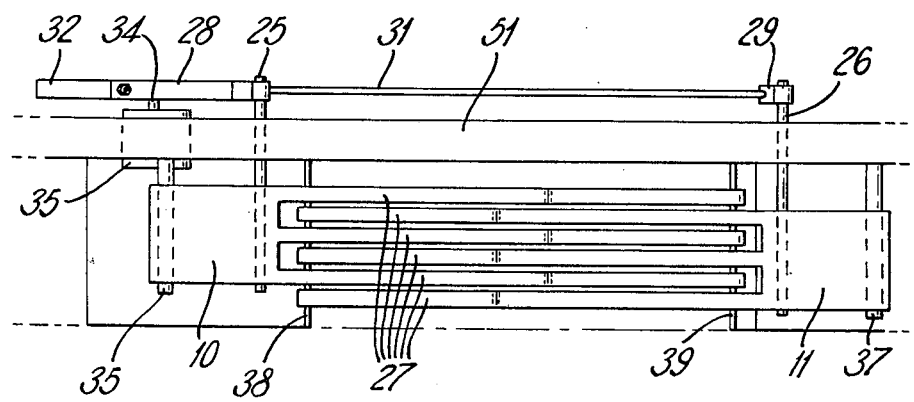
FIG. 23 is a plan view of the arrangement shown in FIG. 22.

The sensor 624 is basically the same as the sensor shown in FIGS. 22 and 23 in that the two sensor plates are connected by a lost-motion linkage to a regulating mechanism 639 so that the position of the regulating mechanism is determined by whichever of the plates is lower. The regulating mechanism in this case controls the direction and speed of movement of the band conveyor 625 and reservoir conveyor 602. Further details may be seen from the description relative to FIGS. 22 and 23.

Figures 6, 7:
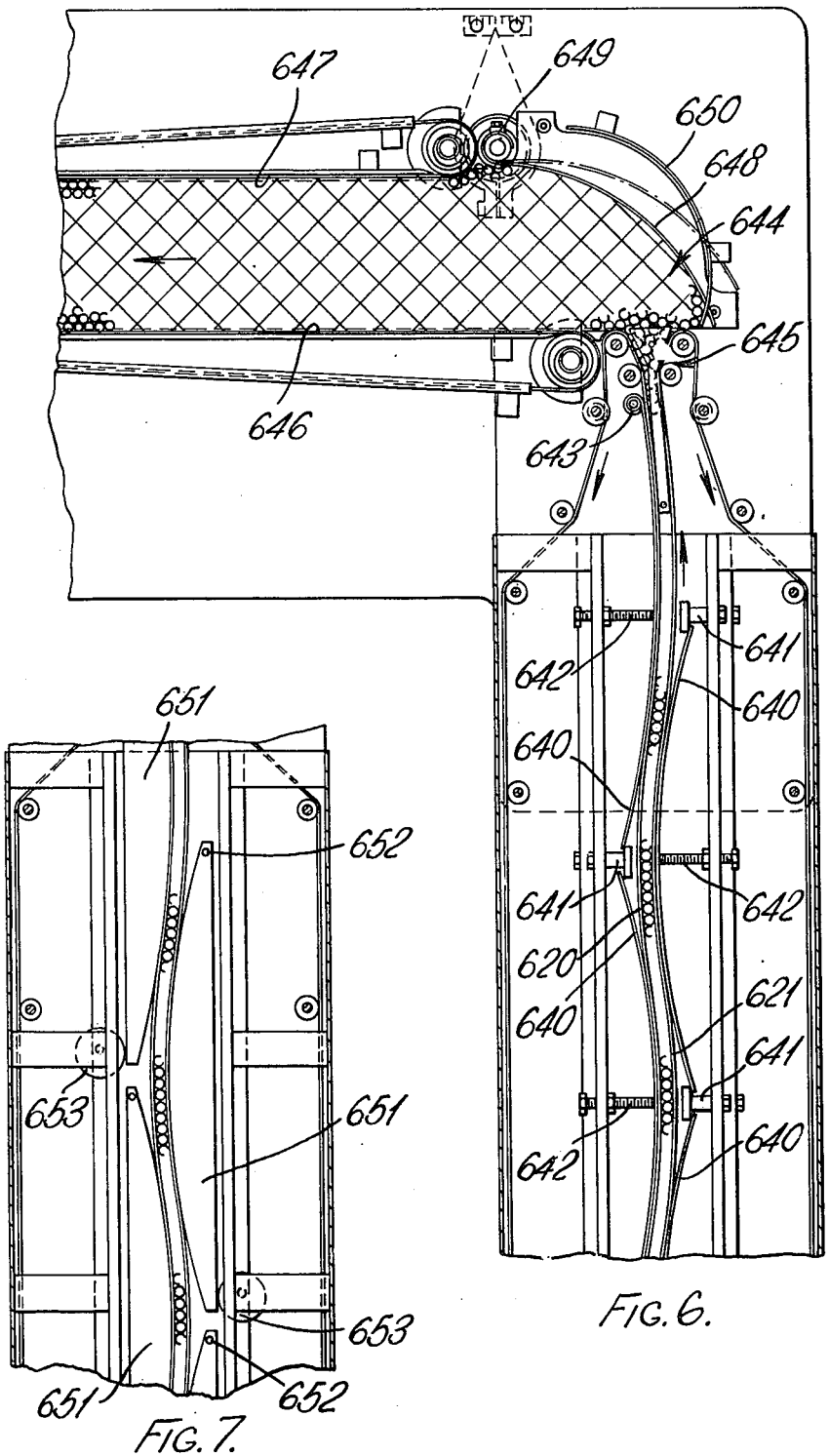
FIG. 6 is an enlarged view of a portion indicated by the arrow VI in FIG. 3 and including part of the elevator.
FIG. 7 shows a possible modified form of elevator.
Figure 12:
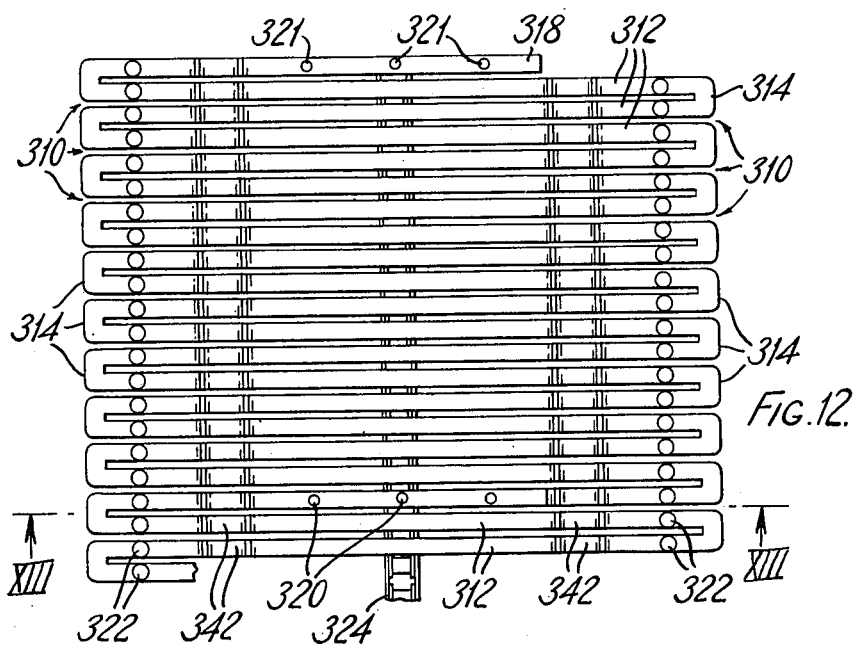
FIG. 12 is a plan view of part of a laterally flexible conveyor which forms the floor of the reservoir in FIG. 1.
Figure 13:
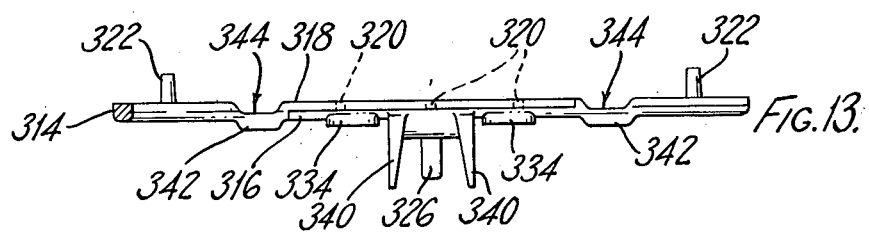
FIG. 13 is a section on the line XIII—XIII in FIG. 12.

FIG. 6 shows in enlarged scale the part of the system indicated by the arrow VI in FIG. 3.

As shown in FIG. 6, the parallel bands 620 and 621 of the elevator are constrained to move upwards along a curved sinuous path by means of a number of staggered and oppositely facing curved plates 640. Each plate (with the exception of the top one) has its ends held by anchor members 641 and is flexed into a curved state by an adjustable screw 642. The top plate instead has its upper end anchored round a pin 643. The screws 642 can be screwed in or out to vary the gap between opposite plates in accordance with the needs of different cigarettes with different diameters. The bands 620 and 621 are kept in tension (for example by means of idler tensioning pulleys) so that the cigarettes are always gripped by whichever band is on the outside of the curve.

As the bands 620 and 621 approach a junction zone 644 they diverge at 645 so that the spacing between the bands increases to a value equal approximately to three times a cigarette diameter. This helps to smooth the entry of the cigarettes into the junction zone 644.

From the junction zone 644 the cigarettes are carried away in stack formation by a band conveyor 646 with the aid of a parallel band conveyor 647 confining the upper surface of the stack. The band conveyors 646 and 647 are driven at a variable speed determined by the position of a curved sensor plate 648 which is connected to a rotary regulating mechanism 649 and swings up and down in accordance with the upward pressure of the cigarettes in the junction zone 644. The plate 648 is slotted so as to interleave with a stationary slotted guide plate 650.

Figure 20:
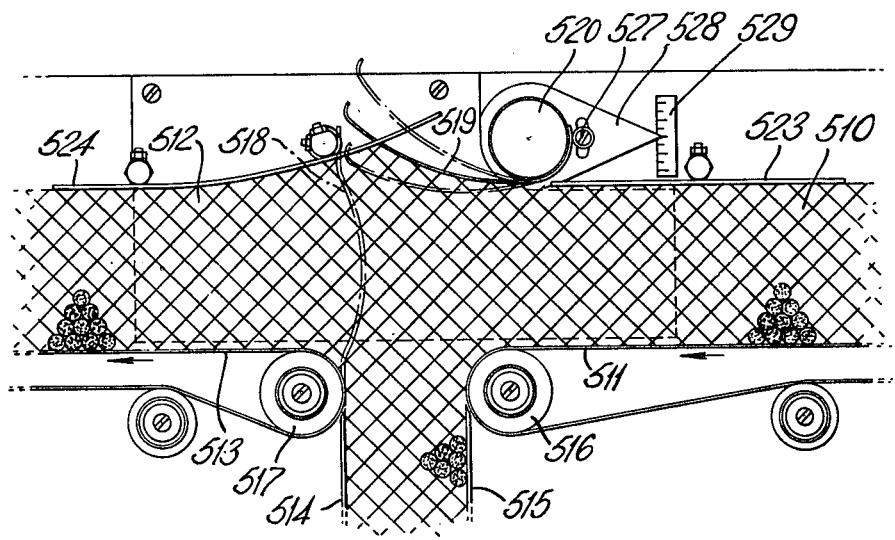
FIG. 20 is an enlarged view of one of the sensor mechanisms XX shown in FIG. 8.
Figure 21:
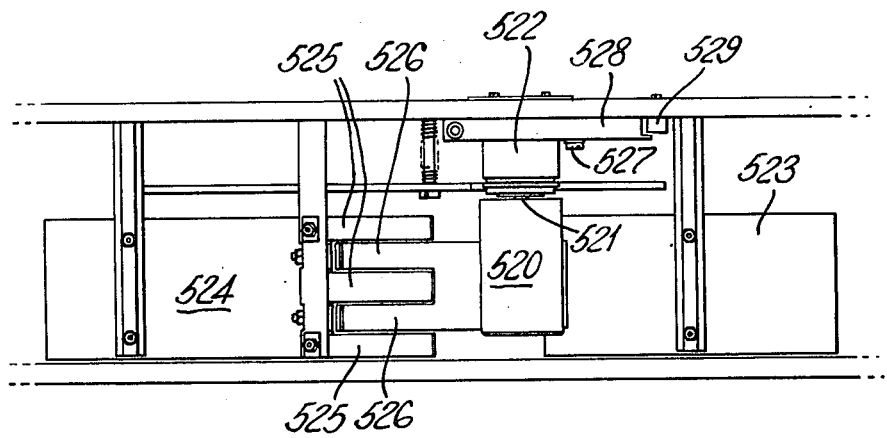
FIG. 21 is a plan view of the arrangement shown in FIG. 20.

The operation and adjustment of the regulating mechanism 649 is similar to that of the regulating mechanism 520 shown in FIGS. 20 and 21.

The conveyor 615 (see FIG. 3) receives the stack of cigarettes from the band conveyor 646 and is driven at the same speed.

It should be noted that the thickness of the cigarette stack (i.e. measured vertically) delivered from the junction zone 644 is the same as the stack thickness in the reservoir which in one example is approxiately 9 cm. In general the stack thickness is preferably not less than say 7 cm (as this would necessitate an excessively long reservoir) and is not greater than say 11 cm for the sake of the desired gentle handling of the cigarettes. The thickness of the stack fed down the chute to the packer is approxiately the same, being only slightly less. It should be noted that cigarettes shown in FIGS. 4 to 7 are not drawn exactly to scale.

FIG. 7 shows an alternative elevator construction. Instead of the flexible plates 640 there are rigid members 651 which are pivoted about their upper ends on pins 652. Adjustment of the gap between the members 651 is achieved by rotating into different angular positions a number of cams 653 bearing against the lower ends of the members 651.

The reservoir shown in FIGS. 1 and 2 has a relatively small capacity. In order to obtain a larger capacity, the distance between the drums 604 and 605 may be increased; alternatively the vertical extent of the reservoir may be increased, so as to include more flanges 603 and 606 and more turns of the helix.

FIGS. 8A to 8F show diagrammatically various different conveyor systems according to this invention. In each case the numeral 616 identifies a chute feeding a stack of cigarettes down to a packer, and the numeral 623 identifies an elevator (for example as shown in FIG. 6) feeding cigarettes upwards from a cigarette-making machine. The numeral 602 identifies a conveyor which forms part of the rservoir or feeds the cigarettes into the reservoir.

Four different forms of sensor are shown. The arrows IV, VI, XX and XXII indicate respectively sensors as shown in FIGS. 4, 6, 20 and 22. The broken lines indicate which stack conveyors are controlled by the various sensors.

It will be seen that FIG. 8A corresponds to the system shown in FIGS. 1 to 7. FIG. 8B shows an alternative system for linking one marker to one packer, where the reservoir is adjacent to the maker, instead of being adjacent to the packer as in FIG. 8A; an example of this is shown in FIGS. 10 and 11. FIGS. 8C and 8D show two ways of feeding one packer from two makers, and FIGS. 8E and 8F show two ways of feeding two packers from two makers.

FIG. 9 shows diagrammatically a further system which in basic layout is like FIG. 8B. Cigarettes 101 coming from one or more cigarette-making machines are conveyed upwards by opposed bands 102 in the manner disclosed in British Patent Specification No. 1,082,941. As shown, the cigarettes are conveyed in stack-formation between the bands 102; they could, however, be conveyed as a single row, the bands being suitably close together for this purpose. The normal flow path of these cigarettes is towards the right as viewed in the drawing, between opposed endless bands 103 and 104, which convey the cigarettes to a chute indicated in the drawing by walls 105 and 106 and leading to the hopper of a cigarette-packing machine 107; more than one such chute can be provided, serving more than one packing machine, as disclosed in French Pat. No. 1,509,322.

Extending to the left in the drawing are opposed endless conveyors 108 and 109; a wall 110 is mounted on the conveyor 109 for movement therewith. The conveyors 108 and 109 are at times stationary and at other times move in one direction or the other, as indicated by the double-headed arrow. These two conveyors and the wall 110, constitute a reservoir for cigarettes. The upper conveyor 108 can if desired be replaced by a stationary top plate, or it can be arranged to extend a short distance, a stationary plate being provided beyond that as a continuation of the conveyor 108.

Bridging the gap between conveyors 103 and 108 is a sensor member 111 which is freely movable up and down between walls 112, and which rests on the cigarettes beneath it. A similar member 113 is located above the chute defined by the walls 105 and 106. The member 111 acts to detect an excess or deficiency in the rate at which cigarettes are arriving from the bands 102 in relation to the rate at which they are being taken by the packing machine or machines. If there is an excess, the member 111 will be pushed upwards; this movement is utilised to actuate control means (not shown) by which the conveyors 108 and 109 are moved towards the left as viewed in the drawing, thus enlarging the capacity of the reservoir which can thus accommodate the excess of cigarettes. Similarly if there is a deficiency, the member 111 is lowered, and in response to this movement the conveyors 108 and 109 are moved to the right in the drawing, so that cigarettes move from the reservoir to make good the deficiency. The members 111 and 113 with their enclosing walls 112 themselves constitute small reservoirs which can accommodate small short-term fluctuations. The member 113 ensures that the space above the chute 105, 106 is kept full of cigarettes.

The main reservoir, constitute by the conveyors 108 and 109 and the back wall 110, is intended to accommodate large and continuing differences between the rate of supply and the rate of demand by the packing machine or machines, so as to enable cigarettes to continue to move in a continuous flow from their source to their destination. If the rate of supply is greater than the rate of demand, excess cigarettes are received in the reservoir; conversely if it is smaller, cigarettes are drawn from the reservoir to satisfy the demand.

To allow the reservoir to accommodate a large accumulation of cigarettes without occupying too much floor space, it is arranged in successive levels one above another as diagrammatically shown at the left-hand side of the drawing, where the conveyor 109 is shown as an ascending helix 115; the upper conveyor 108 terminates a short distance from the reservoir entry and a stationary cover is provided beyond it which follows the disposition of the conveyor 109. The conveyor 109 is in the form of a laterally flexible conveyor, for example as shown in FIGS. 12 to 17. The return run of the conveyor 109 can be guided in any convenient way; in the drawing the return run of the conveyor 109 is indicated diagrammatically at 119.

The conveyor 109 is shown as an ascending helix, but it can equally well be formed as a descending helix, if conditions are such that this is both practicable and desirable. Similarly, the conveyor 9 could, if desired, follow a helical path over part of its travel, followed by a path of different configuration, e.g. a straight, curved, or sinuous path, or any convenient combination of these. It will be appreciated that the most suitable configuration of the conveyor 109 will depend to some extent on the arrangement of the particular factory in which the apparatus is installed, and one of the advantages of a reservoir constructed in accordance with the invention is that it can easily be adapted to suit local conditions so as to avoid existing installations or structural features and also to avoid constituting an obstruction. The reservoir conveyor 109 could in principle wind its way around a factory in any desired fashion wherever there is space, preferably without moving upwards or downwards steeply (i.e. not over 10° to the horizontal) to avoid a risk of the cigarettes rolling about.

FIGS. 10 and 11 show another different system. The reservoir in this case is formed by a hollow upright cylindrical drum 230 around which there is a helical platform 232 which forms the floor of the reservoir. The pitch of the helix is such as to accommodate between turns a stack 234 of cigarettes or other rod-like articles lying radially.

A conveyor band 236 feeds the article stack tangentially to or from the reservoir. A thin stationary member 238 in FIG. 11A bridges the gap between the conveyor and the helical platform on the drum. While articles are being fed into the reservoir, the direction of movement of the conveyor and drum are as shown by arrows in FIG. 11A. These directions both reverse when the reservoir returns articles to the conveyor 236, during which stage a stationary scraper 240 guides the article stack off the helical platform and on to the conveyor.

As it rotates the drum must necessarily rise or fall, depending upon the direction of rotation, so as to advance axially during each revolution by an amount equal to the pitch of the helix. This is achieved by supporting the drum by means of a number of support rollers 242 on whch an internal helical flange 244 in the drum rests, this helical flange having the same helix pitch as the platform 232 and being preferably aligned with the platform as shown; the support rollers are circumferentially spaced around a rim 246 on a circular member 248, and rotate about axes lying radially with respect to the drum, the height of the axes being appropriately varied in view of the slope of the helix. Rollers 250 circumferentially spaced around the circular member 248 roll against the inner surface of the drum to locate the drum laterally.

The drum is driven by a motor 252 mounted on a central column 254 which also carries the circular member 248. The drive is via a universal coupling 256 and a drive roller 258 mounted on the end of a shaft 260. The shaft passes through a vertical slot 261 in the rim 246 and is supported by a self-aligning bearing 262 which is urged downwards by a compression spring 264 to produce the necessary frictional driving reaction between the roller 258 and the upper surface of the flange 244 engaged by this roller.

FIG. 10 shows also a junction 265 at which a single row of cigarettes or other articles 266 is fed upwards by bands 267 and 269 into the horizontal stack of articles carried on one side by the conveyor 236 and on the other side by a conveyor 268. The conveyor 268 may for example lead via one or more similar junctions to one or more cigarette packing machines.

Above and opposite to the article input to the junction there is a vertically slidable sensor member 270 which is slidable between walls 271 and 273 and preferably controls the speed and direction of the conveyor 236; alternatively, the speed and direction of the conveyor 236 may in principle be controlled automatically in some other way, for example in response to the rate of delivery of articles by the bands 267 and 269, and the rate at which articles are absorbed by the packing machinwe or machines, while the walls 271 and 273 and the member 270 may serve primarily as a small variable-capacity reservoir to cater for short-term variations in the volume which the articles require to occupy at the junction 265.

FIG. 11B shows an alternative way of feeding the stack to and from the reservoir. In place of the scraper there is a band 275 which extends tangentially against the inner face of the stack and winds up the drum alongside the stack of cigarettes on the drum, to an anchorage point at the top of the drum, so that the band 275 moves at the same speed as the stack entering or leaving the reservoir. In the other direction from a pulley 276 the band 275 extends tangentially towards the other side of the drum and winds down the drum to an anchorage at the bottom end of the drum. In addition there may be an endless band 277 passing round pulleys 278 and 279; the spacing between the bands 275 and 277 along their parallel runs may be such that the bands grip the stack of cigarettes between them to assist in carrying the cigarettes over the bridge member 238.

FIGS. 12 to 17 show in detail the laterally flexible conveyor used in the helical reservoir shown in FIGS. 1 and 2. The conveyor comprises a chain 324 connected to a conveyor surface member of plastic (shown alone in end view in FIG. 13) formed in a number of separately moulded sections joined together end-to-end. The surface member is moulded (for example from acetal or nylon) with slots 310 extending alternately from opposite edges so as to leave a series of parallel legs 312 joined together by edge portions 314 so as to form a close zig-zag shape. The cross-section of the legs is approximately square. Each surface member section has seventeen complete legs and a partial leg at each end, these partial legs being cut away respectively on the top (i.e. the leg 316 in FIG. 13) and underneath (i.e. the leg 318 in FIG. 13) so that the co-operating legs of two adjacent sections can form a lap joint. The partial leg 316 of each section has three projections 320 which engage in corresponding holes 321 in the partial leg 318 of the adjoining section. Each lap joint may be secured by an appropriate adhesive or by the application of heat, preferably by means of ultrasonics.

Figure 16:
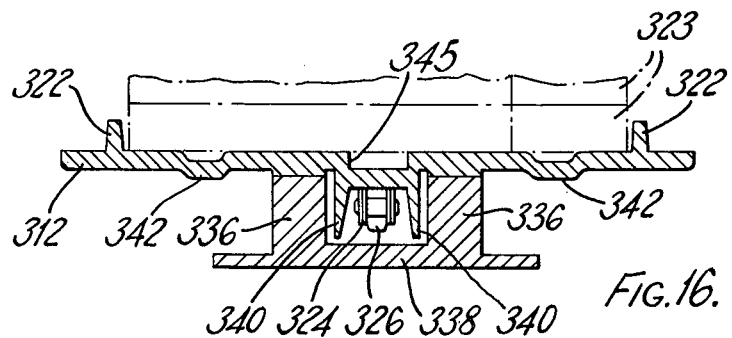
FIG. 16 is a section on the line XVI—XVI of FIG. 15, showing also the conveyor track.

Near the end of each leg 12 there is an upwardly extending projection 22. As shown in FIG. 1, the projections lie close together in rows so that they limit the lateral movement of the cigarettes or other rod-articles carried by the conveyor. The articles are intended to lie across the conveyor, that is to say parallel to the legs 312, and they may be stacked up, for example to a height of 7 to 11 centimeters. FIG. 16 shows part of a stack of cigarettes 323 lying on the conveyor. The conveyor may however be used to carry a single row of cigarettes or other articles.

Figure 14:
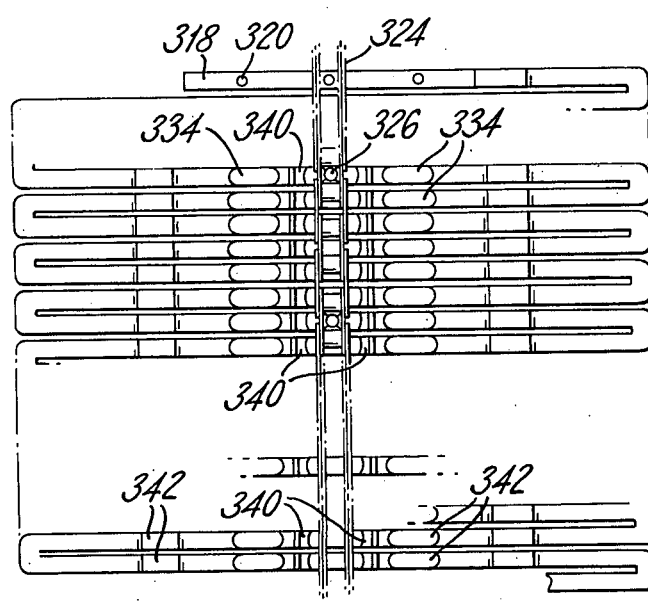
FIG. 14 is an underneath view.
Figure 17:
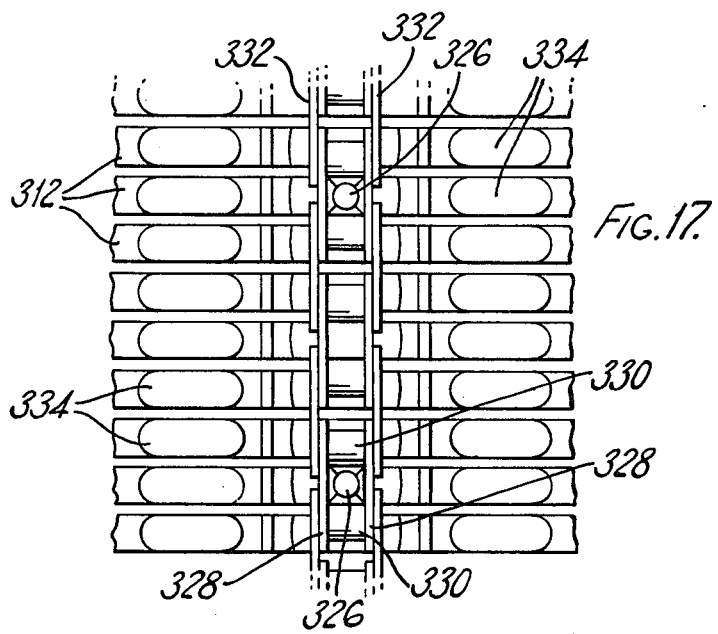
FIG. 17 is a fragmentary enlarged underneath view showing how the conveyor surface member is secured to the chain.

Along the centre line of the conveyor, beneath the conveyor surface member, lies the chain 324 which drives the conveyor surface member. As shown in FIGS. 14 and 17, the chain is secured to the surface member by means of integral studs 326 on the surface member which project between each second pair of inner links 328 of the chain. The chain is of a known construction and has inner links 328 (see FIG. 17) secured together at opposite ends by tubular ferrules 30; outer pairs of links 32 connecting the inner links are themselves connected together near their opposite ends by lateral pins passing through the ferrules 330. Each section of the conveyor surface member has three studs 326. The arrangement is such that there is a stud 326 on every sixth leg 312.

The studs 326 may be secured to the chain by having their ends swaged over, for example with the application of heat.

Beneath each leg 312, on opposite sides of the centre line along which the chain extends, there are two protrusions 334 presenting flat bottom surfaces which serve as bearing surfaces sliding on the opposite walls 336 of a conveyor track 338 (see FIG. 16). The walls 336 not only carry the conveyor, but also locate the conveyor laterally by co-operation with downwardly extending guide portions 340 on the legs. The track 338 may, for example, be an extruded plastic section, for example of nylon.

Figure 15:
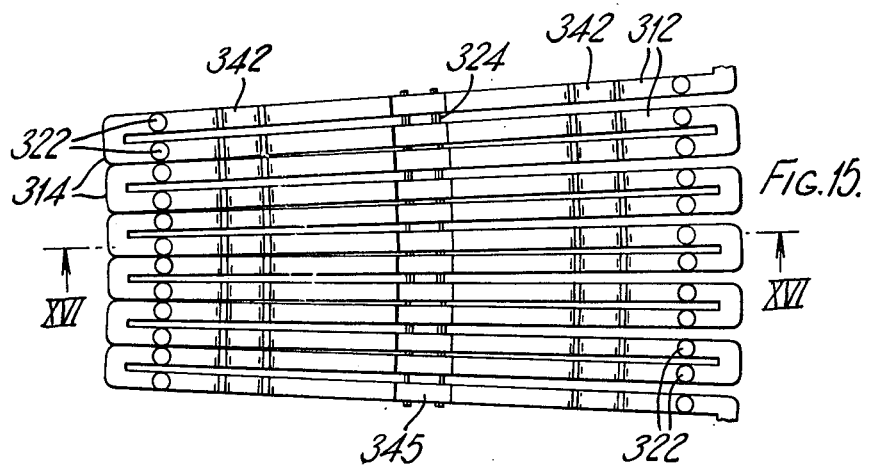
FIG. 15 is a plan view showing the conveyor in a laterally curved state.

FIG. 15 shows how the conveyor can curve laterally. It will be seen that this is accompanied by opening out of the slots on the outside of the curve (i.e. on the right as seen in FIG. 15), while the slots on the inside of the curve are reduced in width. The clearance between the links of chain enable the chain to follow the same curve. In the limiting position shown in FIG. 15, the legs touch at the inside of the curve. At this stage, it will be seen that, with the preferred arrangement, shown the width of the slots on the outside of the curve is still small in comparison with a cigarette diameter. The fact that there are slots into which the outer ends of the cigarettes (i.e. the ends on the outside of the curve) can drop slightly while the conveyor is curving round a corner assists in maintaining the cigarettes precisely radial with respect to the curve; this helps to ensure that the cigarettes are properly aligned laterally across the conveyor when they are delivered from the conveyor.

The lateral curvature shown in FIG. 15 is or may be such that the radius of curvature of the centre line of the conveyor is as little as approximately 40 centimetres.

Owing to the torsional flexibility of the legs of the conveyor surface member, the conveyor can be curved in a manner of a band conveyor passing round a pulley. Where the chain lies on the outside of the curve, the conveyor may pass round a pulley. On the other hand, when curving in the opposite sense (i.e. with the chain at a small radius) the conveyor may be supported simply by a driving or idling sprocket around which the chain engages, asshown in FIG. 5. The radius of the sprocket may be as small as 5 centimeters or even slightly smaller.

While it is being carried around one of the drums 604 and 605 of the reservoir shown in FIGS. 1 and 2, the conveyor surface member is supported on one side by one of the flanges 603 or 606, which extends up to the nearer row of guide portions 340, while a stationary rail (not shown) extends beneath the conveyor surface member near its outer edge to provide the necessary additional support; the rail is appropriately curved so as to support the outer edge of the surface member all the way round the drum.

By way of example, the chain 24 may be a 6 mm or ¼ inch bush chain.

To assist in guiding the cigarettes onto and away from the conveyor, the legs of the conveyor surface member have rows of offset portions 342 leaving upper recesses 344 into which stationary guide fingers can extend. For example, cigarettes may be delivered from a horizontal run of the curvable conveyor onto a conventional band conveyor via a stationary bridge which would include the necessary fingers extending into the recesses 344 to help the cigarettes on the curvable conveyor to pass over the stationary bridge while the curvable conveyor curves downwards round a return sprocket. Alternatively the bridge may have a single central finger projecting into the recess 345 shown in FIGS. 15 and 16. In this connection it should be noted that FIGS. 15 and 16 differ slightly from FIGS. 12 and 13 which do not show the recess 345. In order to be able to provide the recess 345 it is necessary to arrange that the overlapping parts 16 and 18 joining adjacent sections of the surface member together lie entirely to one side of the recess 345.

If the conveyor is intended to be curved only in one direction, one of the two rows of projections 322, namely the row on the inside of the curve, may be omitted as centrifugal force will prevent the cigarettes from sliding radially inwards; moreover there is a slight natural tendency for a stack of cigarettes to be squeezed outwards on a curve.

Instead of the projections 322 being on the legs they may be on the edge portions 314, in which case there may be just one projection on each edge portion.

Different conveyors for use in connection with cigarettes or other rod-like devices of different lengths may consist of mouldings differing only in regard to the distances between the rows of projections 322. Accordingly, the bottom part of the die for each moulding may be common to all mouldings, the only different being in the part of the die which determines the positions of the projections 322.

It is important to note that not every leg of the conveyor surface member is secured to the chain. The studs 326 securing the surface member to the chain are at substantial intervals, with several free legs between successive studded legs. This helps to ensure that the surface member is evenly stressed, especially when passing round a sprocket or pulley.

Figure 18:
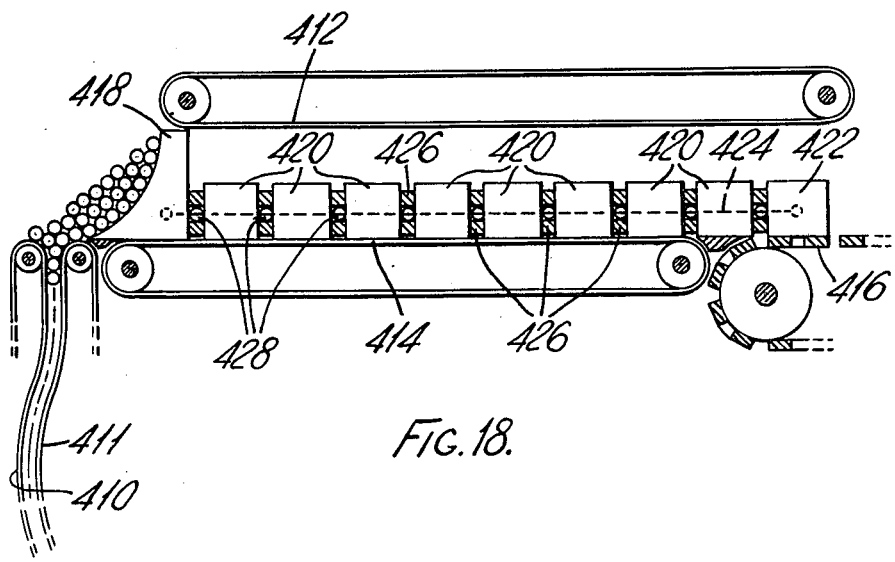
FIG. 18 shows an end wall drive for any of the reservoirs consisting of a laterally flexible conveyor.
Figure 19:
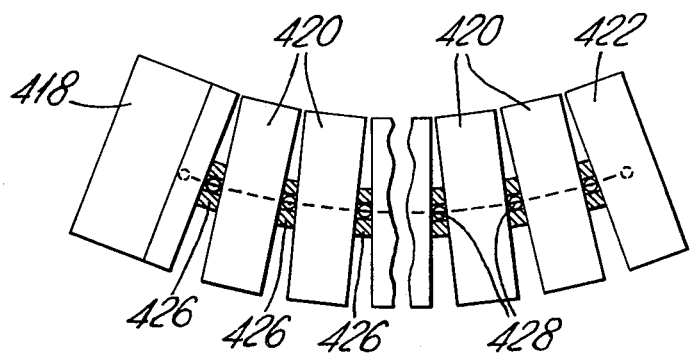
FIG. 19 is a plan view of the arrangement shown in FIG. 18.

FIGS. 18 and 19 show somewhat diagrammatically how the end wall defining the end of the stack of cigarettes in the reservoir may be connected for example to the conveyor 602 in the system shown in FIGS. 1 to 3. It should be noted however that FIGS. 18 and 19 use different reference numerals and show a mirror image in that the reservoir extends in the opposite direction from the elevator (i.e. as in FIG. 8B).

The object of this end wall connection is to enable the end wall to pass over the horizontal band adjacent to the elevator (i.e. the band 625 in FIG. 4) so that the system can, when necessary, be completely emptied of cigarettes on the reservoir side of the junction zone 627 in FIG. 4.

FIG. 18 shows two parallel bands 410 and 411 which form an elevator basically like that shown in FIG. 4 and carry the cigarettes to a junction from which they proceed in stack formation. The cigarette stack to the right of the junction is confined between upper and lower endless conveyor bands 412 and 414 which extend horizontally for approximately the same distance. Beyond the end of the lower conveyor 414, the cigarette stack is carried by a laterally flexible conveyor 416, for exmaple as shown in FIGS. 12 to 17. There is no top wall confining the upper surface of the cigarette stack while it is on the conveyor 416.

During use, the end of the cigarette stack in the reservoir is defined by a movable end wall 418. This is connected by a series of spacer blocks 420 to a block 422 which is secured to the flexible conveyor 416. A flexible cord 424 passes through the spacer blocks 420 and has its opposite ends anchored respectively to the end wall 418 and end block 422.

Between the wall 418 and the blocks 420 and 422 there are spacer rings 426 which are of a soft sponge rubber or some other compressible material, and within these rings there are spherical beads 428. The cord 424 passes through the beads and rings.

The beads 428 space the blocks apart and provide pivot points between blocks. The rubber rings keep the blocks parallel while permitting the centre line of the chain of blocks to assume a curved state (as shown in FIG. 19), for example while passing round the reservoir drums 604 and 605 in FIGS. 1 and 2. During such movement the blocks 420 are located laterally, for example by the projections 322 on the flexible conveyor as shown in FIGS. 12 to 17, the width of the blocks being approximately equal to a cigarette length.

This arrangement enables the end wall 418 to pass over the conveyor 414 to the position shown in FIG. 18 when discharging cigarettes from the reservoir.

The beads 428 may be moulded integrally with the blocks 420, which may be of plastic. As a further alternative, the cord 424 may be omitted and the blocks 420 may be made to interlock with one another and with the end block 422 and wall 418. The interlocking should preferably be such as to permit each block to pivot with respect to the next about a vertical axis (to permit the movement shown in FIG. 19) and also about a horizontal axis to permit the chain of blocks to follow the conveyor 416 while it moves upon a path which inclines upwards or downwards where necessary; if the blocks are of plastic, the interlocking may be such that the plastic flexes slightly when one block pivots with respect to the next.

FIGS. 20 and 21 show in solid outline a sensor mechanism which can be used in place of the double-plate sensor shown in FIG. 4, especially as a replacement for the sensor identified by the row IV in FIG. 8E. FIG. 20 also shows in broken outline a wall 518 which can be added to produce the form of sensor identified by the arrow XX in FIGS. 8B, 8C and (e.

As shown in FIG. 20 in solid outline (i.e. ignoring the wall 518) a stack of cigarettes 510 is fed to the left by a conveyor 511 to a T junction which is completed by a continued horizontal stack 512, carried by a conveyor 513, and a vertical stack lying between side walls 514 and 515. The walls 514 and 515 constitute a chute down which the cigarettes are fed, for example to a packing machine. The conveyor 513 may carry the stack of cigarettes 512 towards a further chute or series of chutes feeding further packing machines. The conveyors 511 and 513 are in the form of endless conveyor bands, and they return round pulleys 516 and 517 as shown.

FIG. 20 shows basically a T junction, but it also shows in chain-dotted outline a convex end wall 518 which may be used to form a simple right-angle downward bend, that is to say a bend which feeds all the cigarettes from the stack 510 down the chute. In the case of a simple bend, it will be appreciated that the conveyor 513 and roller 517 would be omitted. As an alternative to the convex form shown, the wall 518 may be either flat or concave, depending upon the characteristics of the cigarettes being handled.

As shown particularly in FIG. 20, the sensor above the cigarettes at the T junction or bend is in the form of a convex plate 519 which is secured at its upstream end (i.e. on relation to cigarette flow) to a cylindrical member 520. This member 520 is carried by a spindle 521 (see FIG. 21) which is rotatably mounted in a speed regulating mechanism 522 via ball bearings (not shown). The ball bearings enable the plate 519 to rotate very freely so that it can respond rapidly under its own weight, which must below in order not to apply more than the minimum pressure to the cigarettes.

FIG. 20 shows the right-hand end of the plate 519 with its bottom face just above the bottom face of a fixed top wall 523 confining the upper surface of the stack 510. However, the axis of the cylinder member 520 is preferably very slightly lower so that the bottom surface of the plate is just below that of the wall 523; nevertheless it will be appreciated that the plate 519 forms a fairly smooth continuation of the top wall 523.

A fixed plate 524 serves partly as a top wall confining the upper surface of the stack 512 for a short distance from the T junction, and is curved upwards towards its right-hand end so as to define a slightly converging channel for the stack 512 which helps to nest together the cigarettes of the stack 512. Also, as shown in FIG. 21, the right-hand end of the plate 524 has two slots, leaving three spaced legs 525, while the left hand end of the sensor plate 519 has a single central slot, leaving two spaced legs 526. The arrangement is such that the legs 526 of the plate 519 can pass through the slots between the legs 525 of the plate 524. Nevertheless the overlapping of the plates 524 and 519, as seen in FIG. 20, serves to prevent the escape of any cigarettes. As an alternative, the plate 519 may be unslotted, and the right-hand end portion of the plate 524 may be replaced by a plate which extends upwards and is curved about the axis of the cylindrical member 520 so that a fixed small clearance is maintained between that plate and the free end of the sensor plate 519.

The sensor plate 519 is shown in solid outline in FIg. 20 in approximately the middle of its range of movement, while chain-dotted outlines show approximately the upper and lower limits of its movement.

In use, the sensor 519 controls the speed of the conveyor 511. That is to say, as the sensor 519 rises as a result of a build-up of cigarettes beneath it, the resultant clockwise rotation of the member 520 causes the mechanism 522 to reduce the speed of the electric motor driving the conveyor 511; conversely, a drop in the height of the cigarettees beneath the sensor 519 allows the sensor to drop and results in an increase in the speed of the motor driving conveyor 511.

The mechanism 522 may be a known proprietary speed-regulating mechanism and preferably provides for stepless speed control. Adjustment can be achieved in the example shown, by loosening a screw 527 and then moving a pointer 528 to any desired position along a dial 529, after which the screw is again tightened; movement of the pointer 528 in fact rotates the case of the mechanism 522.

FIGS. 22 and 23 show a double-plate sensor for use above the elevator, for example at the positions indicated by the arrows XXII in FIG. 8. It should be noted however that FIGS. 22 and 23 show the sensor as a mirror image of sensors XXII in that the conveyor leading to the reservoir (i.e. the conveyor 15) extends in the opposite direction.

The sensor shown in FIGS. 22 and 23 consists of two sensor plates 10 and 11 which have downwardly convex portions 12 and 13 resting on a horizontal stack of cigarettes carried by two band conveyors 14 and 15. A single row of cigarettes is fed upwards into the junction zone below the plates 10 and 11 by two bands 17 and 18 which return over small idler pulleys 19 and 20. The conveyors 14 and 15 pass round further pulleys 21 and 22, and the horizontal surface on which the complete horizontal stack results is completed by two small bridge pieces 23 and 24.

It wil be seen that the convex parts 12 and 13 of the plates 10 and 11 lie on opposite sides of a vertical plane passing though the single row of cigarettes 16, this lane being the vertical centre line of the junction. Moreover, the plates 10 and 11 and the conveyors 14 and 15 form a symetrical arrangement so that the function of the conveyors 14 and 15 can be interchanged.

The plates 10 and 11 are secured respectively to spindles 25 and 26 by which they are pivotably mounted. As shown in FIG. 23, the two plates are slightly staggered laterally and each has two slots leaving three legs 27, the arrangement being such that the legs of each plate can pass though the slots in the other plate. In other words, the plates interleave with one another.

Outside the cigarette flow channel, the spindles 25 and 26 carry respectively two arms 28 and 29 which are connected by links 30 and 31 to the arms 32 and 33 of a bell-crank secured to a spindle 34 of a rotary speed-regulating mechanism 35 which controls the direction of rotation and the speed of a motor driving the conveyor 15. Each link 30 or 31 passes through a hole in the co-operating arm 32 or 33 and has end nuts so that it can transmit a pull from the arm 28 or 29 to the arm 32 or 33, as the case may be, but not a push. In other words, there is a lost-motion connection between each arm 28 or 29 and the arm 32 or 33 of the bell-crank. As a result of this lost-motion connection, the bell-crank position is determined by whichever of the plates 12 or 13 is in the lower position. The bell-crank is biased in an anti-clockwise direction, for example by the weight of the arm 32.

FIG. 22 shows the plates 12 and 13 in their lowest positions, while the highest possible positions are shown in chain dotted lines, the limit of upward movement being determined by stops 36 and 37. It is important to note that the volume (in terms of the number of cigarettes) lying between the uppermost and lowermost positions of the sensor plates is substantial, i.e. the same order as the average volume of the junction zone. This is significant as it means that the sensor also serves as a useful reservoir to allow for short-term variations in the rates of feed to and from the junction zone.

Plates 38 and 39 co-operate with the ends of the pivoted plates 12 and 13 to prevent the escape of cigarettes, and are appropriately slotted to interleave with the sensor plates. As shown in FIG. 22, the plate 38 at its lower end 38A extends horizontally for a short distance so as to serve as a top wall confining the upper surface of the stack of cigarettes for a short distance from the junction. The plate 39, on the other hand, merely curves upwards slightly to a point close to a band 50 which serves as a top wall confining the upper surface of the stack in the other direction from the junction.

In one possible example, the conveyor band 14 continuously carries to the left a stack of cigarettes delivered by the bands 17 and 18, while the conveyor 15 serves as part of a reservoir which receives cigarettes (i.e. with the conveyor 15 moving to the right) when the upward supply of cigarettes 16 exceeds the rate of withdrawal of cigarettes by the conveyor 14; on the other hand, when the rate of withdrawal of cigarettes by the conveyor 14 exceeds the rate of supply to the junction by the bands 17 and 18, the conveyor 15 moves to the left so as to deliver cigarettes from the reservoir. The sensor in this case may control the speed and direction of movement of the conveyor 15, while another sensor (for example the sensor XX in FIG. 8B) may control the speed of the conveyor 14.

An important advantage of this double-plate sensor is that each plate can be made particularly sensitive to a drop in the level of cigarettes caused by an excessive delivery away from the junction by a conveyor beneath it or nearer to it. Considering for example a mode of operation in which, for the moment, the conveyor 15 is a stationary while the conveyor 14 is moving at a speed which exactly carries away the amount of cigarettes fed upwards by the bands 17 and 18; if then the speed of the conveyor 14 were to increase slightly, or if the rate of upward delivery of cigarettes by the bands 17 and 18 were suddenly to decrease, according to our observation this change would be most quickly manifested by a drop in the level of cigarettes at the end of the conveyor 14, that is to say adjacent to the stationary bridge piece 23. As a result a hollow would form in the upper surface of the stack of cigarettes, and the convex part 12 of the pivoted plate 11 is so shaped (as nearly as possible) that it will sink snugly into the hollow, thus rotating the spindle 34 of the speed-regulating mechanism 35 in a clockwise direction which causes the conveyor 15 to start moving to the left at a speed such as to meet the deficiency in the cigarette supply to the conveyor 14. If the double plate sensor were replaced by a single central sensor (i.e lying directly above the bands 17 and 18), the response would be slower as the level of cigarette would take longer to fall away beneath such a centrally positioned sensor (and in a very extreme case might even fail to drop at all); in other words, the arrangement shown in the present application has a greater sensitivity.

In a different situation the conveyors 14 and 15 may, for example, both be moving away from the junction, and if then the rate of upward feed by the bands 17 and 18 were suddenly to decrease or stop (for example as a result of the cigarette-making machine stopping) there would be an immediate tendency for two hollows to appear in the upper surface of the stack above the ends of the conveyors 14 and 15 (i.e. beneath the convex parts 12 and 13 of the pivoted plates), so that both pivoted plates would drop and accordingly reduce the speed of the conveyor 15 or stop the conveyor 15 or even, in an extreme case, reverse the movement of the conveyor 15, the extreme case being where the supply of cigarettes 16 ceases so that the reservoir conveyor 15 must deliver the necessary cigarettes to the conveyor 14. In such a case, if the conveyor 15 was initially moving at a greater speed than the conveyor 14 then the level of cigarettes would tend to fall away more rapidly beneath the convex part 13 of the plate 10, so that the presence of a sensor plate immediately above the end of the conveyor 15 would in this case again give a greater sensitivity than would be possible with a single centrally positioned sensor.

The mechanism 35 in the example shown is a proprietary speed-regulating mechanism for motors which preferably provides for stepless speed control. It and the spindles 25 and 26 and the stops 36 and 37 are mounted on a side wall 51, as shown particularly in FIG. 23.

As an alternative to the elevator arrangment shown in FIG. 6, consisting of two bands moving along a sinuous path, the cigarettes may be gripped between two bands which move along a straight path and are backed by guiding surfaces, one or both of the bands having a coating of flexible sponge or other material to enable the cigarettes to be gripped gently. Yet another possibility is that both bands may move along parallel straight paths and one or both may be supported laterally (i.e. against movement away from the other band) by means of a guide carrying a layer of sponge or other flexible material (for example with a nylon or other low-friction facing) so that the backing is soft to enable the cigarettes to be gripped lightly by the bands.

In the case of a reservoir according to this invention which comprises a laterally flexible conveyor, for example the reservoir show in FIG. 1 and 2, the conveyor may instead be constructed, for example, as described in either of British Pat. Nos. 1,089,295 and 1,135,792.

I claim:

1. A conveyor system for delivering a row of sideways-moving cigarettes or other rod-like articles upwards into a stack comprising a first substantially horizontal conveyor for carrying a stack of the articles, means defining a junction zone at one end of said first conveyor, and a second sustantially horizontal conveyor having one end adjacent to the junction zone on the side thereof opposite the first conveyor, and an elevator comprising two spaced parallel bands, means for maintaining the bands in tension, means for individually constraining the bands to move upward along a path which is non-linear substantially throughout the upwardly extending portion of said path whereby the bands grip articles between them and drive them upwards to enter said junction zone at a point below the upper surface of the articles in the junction zone in a generally upward direction between the two conveyors, and sensor means responsive to the articles in the junction zone for controlling the movement of one of the said conveyors.

2. A conveyor system as defined in claim 1 in which said means for individually constraining the bands comprises two sets of curved stationary backing members for respectively contacting the outer surfaces of the two bands, the backing members of the two sets being staggered whereby they constrain the bands to move along a curved sinuous path.

3. An overhead conveyor system for feeding cigarettes or other rod-like articles sideways between an article-delivery device, which delivers the articles as a single sideways-moving row, and an article-receiving device which receives the articles in stack formation, comprising means defining a first junction zone, reservoir means in the form of a first substantially horizontal reversible overhead conveyor for conveying the articles in stack formation to and from said first junction zone, means defining a second junction zone, means for feeding said articles upwards from the article-delivery device and into said second junction zone to enter said second junction zone at a point below the upper surface of the articles therein including elevator means comprising two closely-spaced parallel bands arranged to grip each of the articles of the single sideways-moving row of articles, a second substantially horizontal overhead conveyor for carrying a stack of articles from said second junction zone towards the first junction zone, first sensor means responsive to the articles in said first junction zone for controlling the movement of said first overhead conveyor, second sensor means responsive to the articles in said second junction zone for controlling movement of said second overhead conveyor to effect formation thereon of a continuous stack of articles, and means defining an outlet for discharging a stack of articles downwards from said first junction zone to the article-receiving device.

4. A conveyor system according to claim 3, further including means for constraining the parallel bands individually to move upwards along a continuously curved sinuous path so that the cigarettes are gripped at any given position as a result of the tension in whichever band is on the outside of the curve at that particular position.

5. A conveyor system according to claim 4 in which the two bands diverge as they approach the second junction zone.

6. A conveyor system according to claim 3 in which the said first and second overhead conveyors are at substantially the same height whereby articles delivered into said first junction zone by the second overhead conveyor can, when they are not being discharged through said outlet, move substantially horizontally straight through the said first junction zone from the second overhead conveyor and onto the first overhead conveyor.

7. A conveyor system according to claim 3, wherein at least said first sensor means includes means for regulating the speed of the respective first and second overhead conveyors.

8. An overhead conveyor system for feeding cigarettes or other rod-like articles sideways to an article-receiving device from an article-delivery device, which delivers the articles as a single sideways-moving row, comprising means defining a junction zone, a conveyor for carrying articles away from the junction zone in a stack formation towards the article-receiving device, a sensor means mounted adjacent to the junction zone for controlling the movement of the conveyor in response to the articles in the junction zone to control formation of said stack as a continuous stack of substantially predetermined height, and an elevator comprising two closely spaced parallel bands arranged to grip the articles of the single sideways-moving row of articles and to drive the articles upwards into the junction zone to enter the junction zone at a point below the upper surface of the articles in the junction zone.

9. A conveyor system according to claim 8, further including a chute for the downward delivery of articles to said article-receiving device from a second junction zone formed at the end of said conveyor opposite said first-mentioned junction zone, a reversible second conveyor extending substantially horizontally from said second junction zone and forming a variable capacity reservoir, and second sensor means responsive to the pressure of the articles in said second junction zone for controlling the direction of motion of said second conveyor.

10. A conveyor system for forming a continuous, substantially uniform stack of cigarettes or other rod-like articles on an overhead conveyor from a single sideways-moving row of articles supplied by an article-delivery device located beneath said overhead conveyor comprising means defining a junction zone at one end of said overhead conveyor, said junction zone having an inlet at the bottom thereof and an outlet facing said overhead conveyor so that articles supplied through said inlet may pass through said outlet to said conveyor, means for feeding said single row of articles from said article-delivery device upwardly into said junction zone to enter said junction zone through said inlet at a point below the upper surface of the articles in said junction zone, and sensor means responsive to the articles in said junction zone for controlling the movement of said overhead conveyor to effect formation thereon of a continuous stack of articles.

11. A conveyor system according to claim 10, further including a chute for the downward delivery of articles received on said overhead conveyor to an article-receiving device from a second junction zone formed at the end of said overhead conveyor opposite said first-mentioned junction zone, a second reversible overhead conveyor extending substantially horizontally from said second junction zone and forming a variable capacity reservoir, and second sensor means responsive to the articles in said second junction zone for controlling the direction of motion of said second overhead conveyor.

12. A conveyor system according to claim 11 in which the said first-mentioned and second overhead conveyors are at substantially the same height whereby articles delivered into said second junction zone by the first-mentioned overhead conveyor can, when they are not being discharged through said outlet, move substantially horizontally straight through the said second junction zone from the first-mentioned overhead conveyor and onto the second overhead conveyor.

13. A conveyor system according to claim 11, wherein said first and second sensor means each include means for regulating the speed of the respective first-mentioned and second overhead conveyors.

* * * * *